United States Patent [19]

Schurman

[11] 4,166,833
[45] Sep. 4, 1979

[54] METHOD AND APPARATUS FOR MOLDING A PLASTIC ARTICLE

[75] Inventor: Peter T. Schurman, Woodbridge, Conn.

[73] Assignee: The Plastic Forming Company, Inc., Woodbridge, Conn.

[21] Appl. No.: 581,844

[22] Filed: May 29, 1975

Related U.S. Application Data

[62] Division of Ser. No. 408,305, Oct. 23, 1973, Pat. No. 3,933,243.

[51] Int. Cl.² .............. B29C 17/07; B29C 17/10; B29C 17/14
[52] U.S. Cl. .................... 264/540; 264/536; 264/154; 264/163; 425/525; 425/527; 425/531; 425/532
[58] Field of Search ............ 264/89, 90, 92, 94, 264/96, 97–99, 161, 163, 154, 536, 540; 425/290, 292, 296, 298, 302 B, DIG. 212, 326 B, 387 B, 297, 305 B, 525, 527, 531, 532

[56] References Cited

U.S. PATENT DOCUMENTS

| | | | |
|---|---|---|---|
| 3,004,285 | 10/1961 | Hagen | 264/163 X |
| 3,452,125 | 6/1969 | Schurman et al. | 264/89 |
| 3,484,510 | 12/1969 | Corazza | 264/90 X |
| 3,608,143 | 9/1971 | Schultz | 264/90 X |
| 3,711,233 | 1/1973 | Uhlig | 425/302 |
| 3,845,187 | 10/1974 | Dahlberg | 264/154 |
| 3,869,237 | 3/1975 | Hellmer et al. | 425/292 |
| 3,869,239 | 5/1975 | Confer | 425/326 B X |

Primary Examiner—Jan H. Silbaugh
Attorney, Agent, or Firm—Christel, Bean & Linihan

[57] ABSTRACT

A tray of thermoplastic material having means releasably latching a power tool in storage position thereon with the tool handle oriented to serve as the carry handle for the tool and attached tray, the tray providing storage for the power cord and accessories. An opening through a wall of the tray is defined by shearing the material during the blow mold cycle.

6 Claims, 16 Drawing Figures

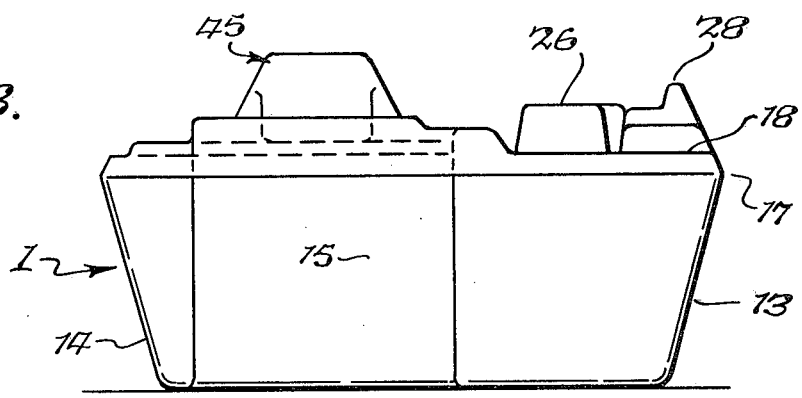
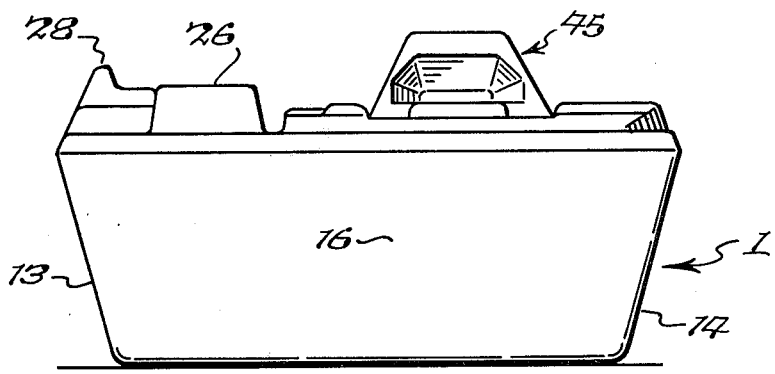
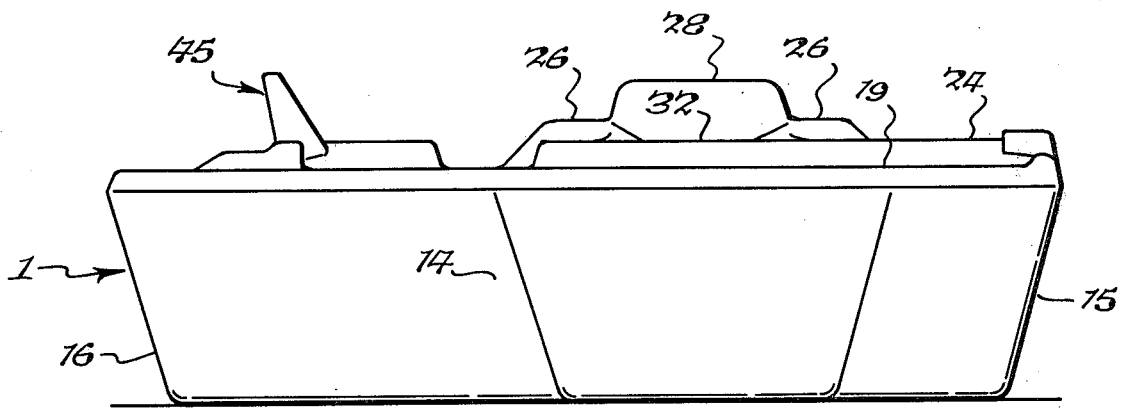
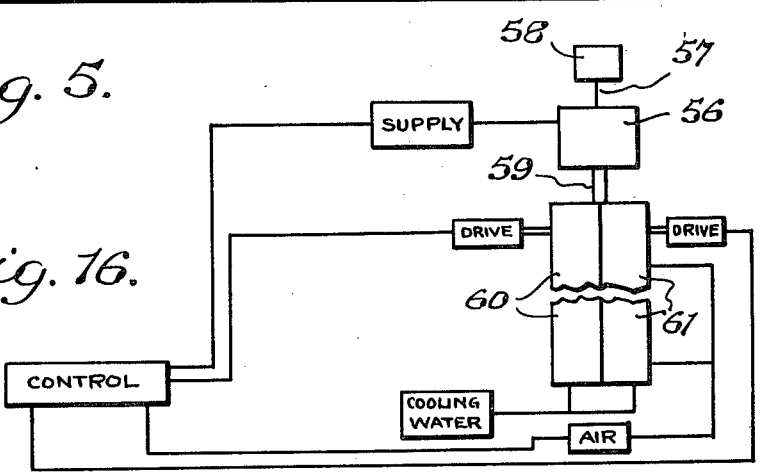

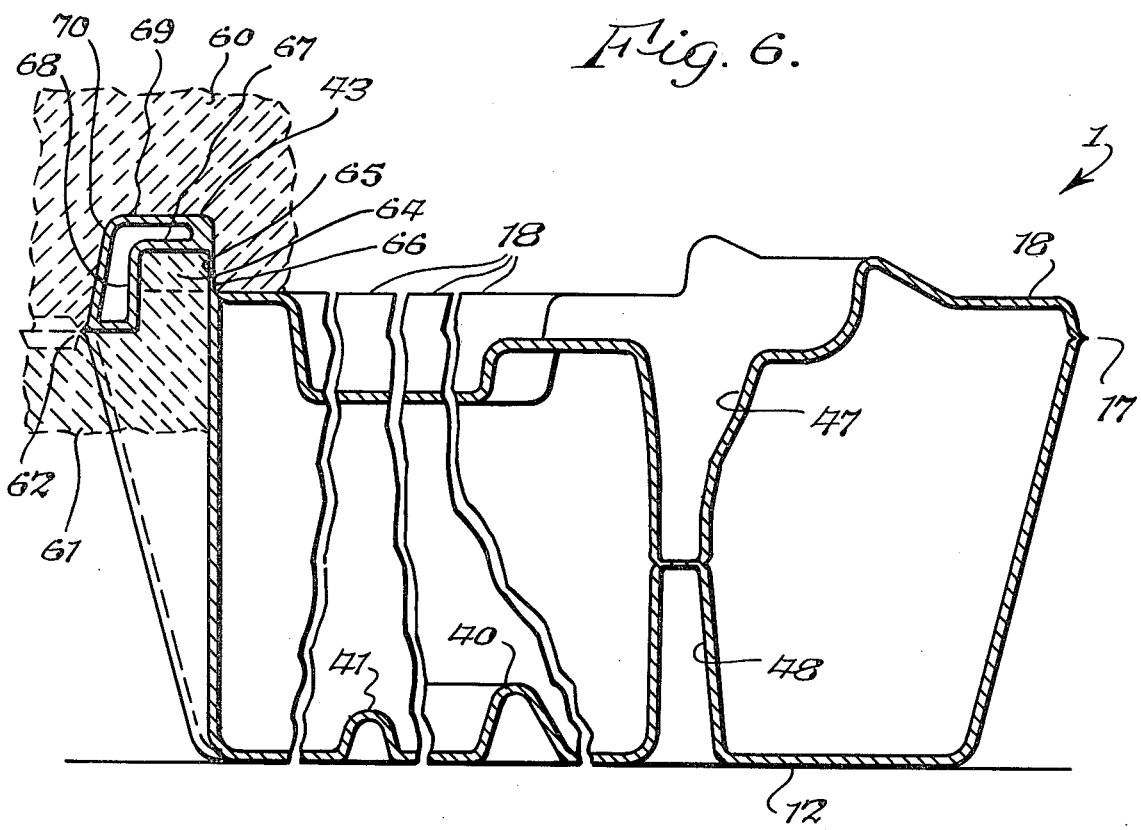
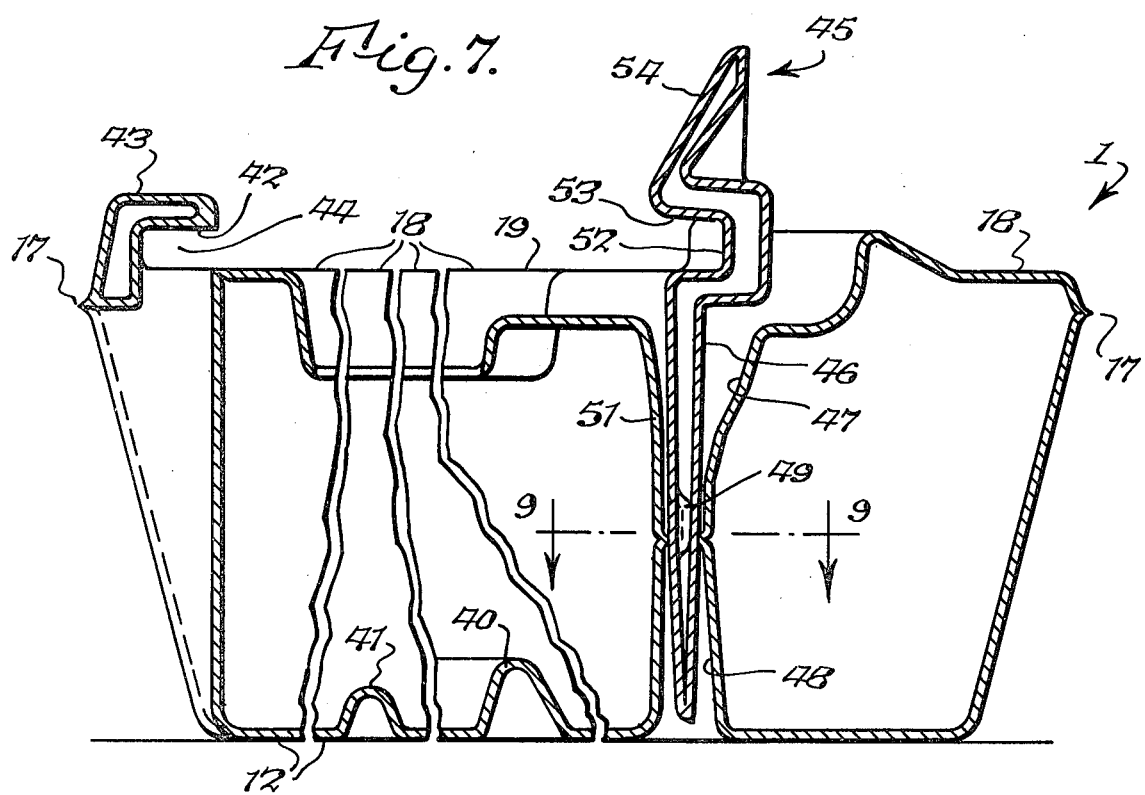

METHOD AND APPARATUS FOR MOLDING A PLASTIC ARTICLE

This is a division, of application Ser. No. 408,305 filed Oct. 23, 1973, now U.S. Pat. No. 3,933,243, issued Jan. 20, 1976.

BACKGROUND OF THE INVENTION

This invention relates generally to the container art, and more particularly to a new and useful power tool storage tray blow molded of thermoplastic material.

Power tools such as circular saws are customarily stored and carried about in metal carrying cases provided with a hinged cover adapted to be latched in closed position and having a handle attached thereto. Such saws can be quite heavy, on the order of 8 to 13 pounds, which means that the hinge, the latch and the handle, as well as the metal itself, all must be constructed of sufficient strength to support the full weight of the saw when carrying it about. The result is a relatively heavy, bulky housing structure.

Such metal carrying cases also have the merchandising disadvantage that the saw itself is hidden within the container and is not exposed to view unless the container is open. Even then, the saw is within the container well and must be lifted out for visual inspection.

It is known to mold such cases of a plastic material, but they have most of the foregoing disadvantages because they also completely enclose the saw and must be sufficiently strong to support the full weight of the contained saw. While a molded plastic case can present a more attractive appearance from a merchandising viewpoint, they tend to do so at the sacrifice of storage capacity as contrasted with the bulker metal box.

Therefore, it remains highly desirable to provide an alternative packaging for such power tools which also will accomodate various accessories when the tool is being carried about and which will provide a storage place for both the tool and its accessories in a low cost, low-bulk and light-weight arrangement facilitating the display of the stored tool for merchandising purposes.

It is known to provide a tray which is compartmented to hold various accessories and to hold a tool such as a drill, but in a relatively involved and expensive molded construction in which all of the various parts including the tool are fitted in a caddy type of container having its own handle for carrying the same about. For heavier tools the problem remains of designing a construction including a handle arrangement of adequate strength to support the full weight of the tool when carrying it about.

Another problem arises in connection with providing an opening through a wall of a blow molded article such as a hollow box, for example to provide access to the interior thereof for storage. Such openings are customarily formed by removing the plastic material after molding, as by cutting or routing, to form the opening. Sometimes the proximity of an adjacent part of the box structure makes the removal of such material very difficult, imposing a design limitation sometimes necessitating redesign of the article. It would be highly advantageous to blow mold an article in a manner forming such openings during the mold cycle, or at least forming the article in a manner facilitating the subsequent removal of material to form the opening.

SUMMARY OF THE INVENTION

A primary object of this invention is to provide a tray on which the power tool is stored and in which various accessories and miscellaneous hand tools can be stored, the tray being carried about with the power tool using the tool handle itself as the supporting handle for the tool and the attached tray.

Another object of this invention is to provide the foregoing in a storage tray which supports the tool in a manner effectively displaying the same in its storage position. Still another object of this invention is to provide the foregoing in a relatively simple, inexpensive and light-weight construction which can be blow molded of thermoplastic material and which cushions the supported tool.

A further object of this invention is to provide a simple, inexpensive plastic latch arrangement for releasably latching the supported tool in storage position on the plastic tray.

In addition, an important object of this invention is to provide a method of blow molding and means for blow molding plastic articles having an opening through a wall thereof at an angle to and within the parting line, wherein the opening is formed or substantially formed by the mold during the mold cycle.

The foregoing and other objects, advantages and characterizing features of this invention will become apparent from the following detailed description of certain selected embodiments which are intended to be illustrative of the invention.

BRIEF DESCRIPTION OF THE DRAWING FIGURES

FIGS. 3 and 4 are opposite end elevational views thereof, the power tool and accessories being omitted for greater clarity;

FIG. 5 is an elevational view of the opposite side thereof;

FIG. 6 is a sectional view thereof on an enlarged scale, taken about on line 6—6 of FIG. 2 but showing the same as molded and prior to removal from the mold, a fragment of which is indicated in phantom, parts being broken away for convenience in illustration;

FIG. 7 is a view like that of FIG. 6, but after removal from the mold and cutting away of material as hereafter described, and after assembling the latch;

FIG. 16 is a schematic view of an apparatus used in forming the support tray of this invention.

DETAILED DESCRIPTION OF THE ILLUSTRATED EMBODIMENTS

Figure 1:
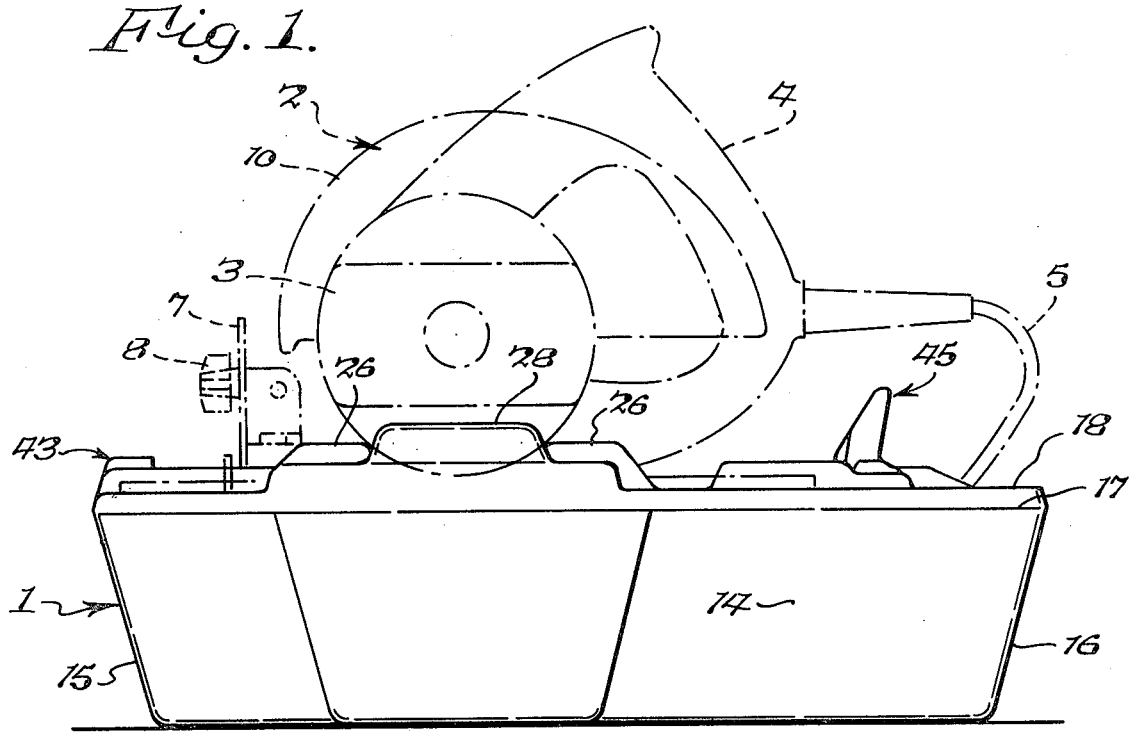
FIG. 1 is a view showing an illustrative support tray and container of my invention in side elevation, with the supported power tool, in this case a power saw and accessories being indicated in phantom.
Figure 2:
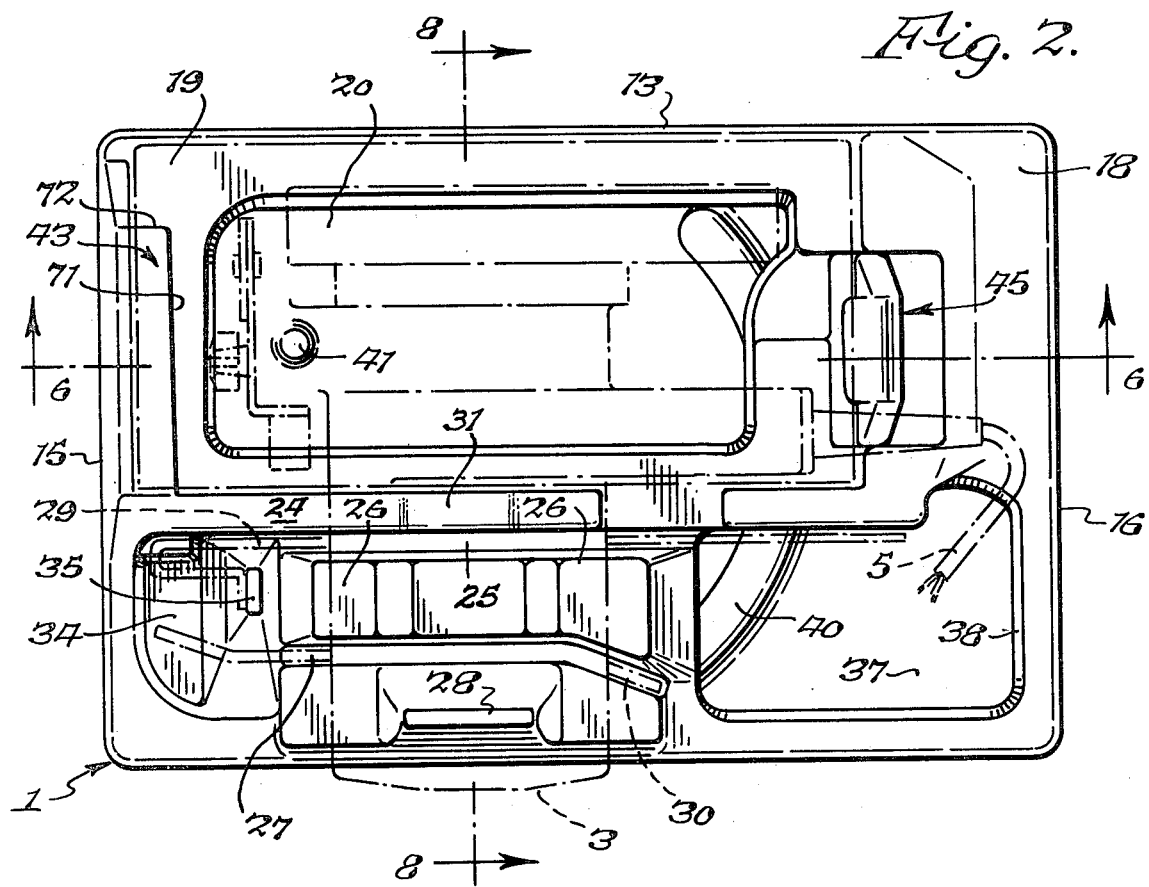
FIG. 2 is a top plan view thereof.
Figure 8:
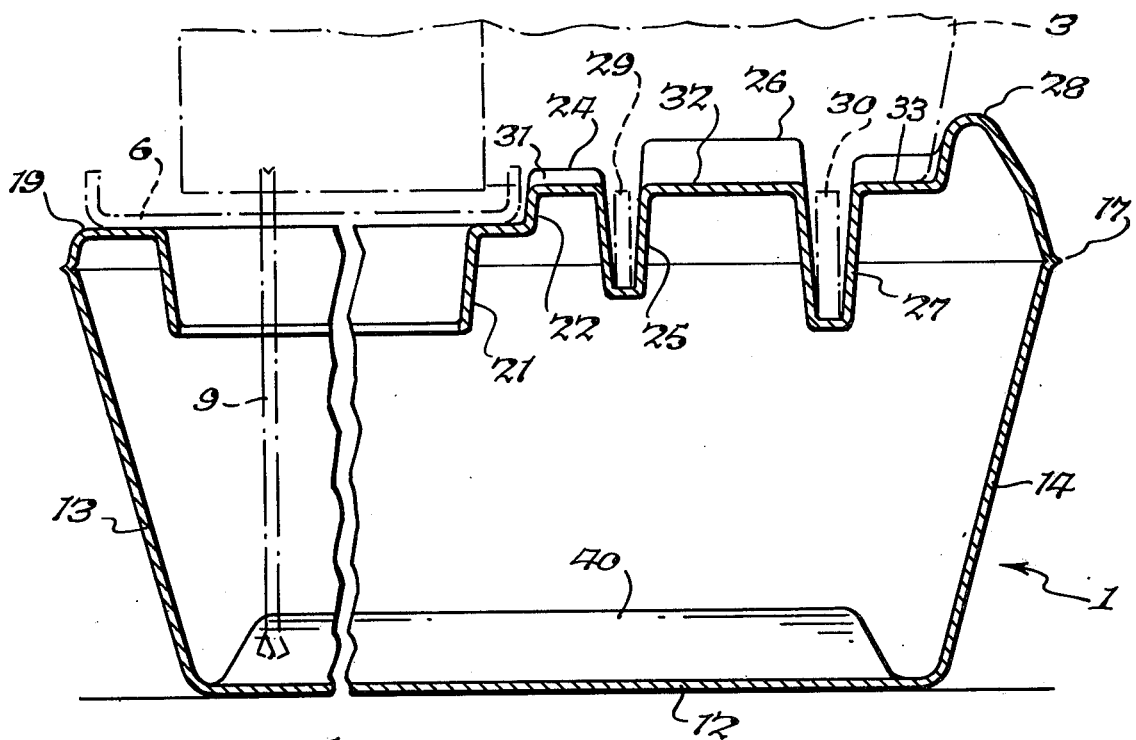
FIG. 8 is a sectional view thereof taken about on line 8—8 of FIG. 2 but on an enlarged scale and with parts broken away for convenience in illustration.

Referring now in detail to the accompanying drawings, there is shown in FIGS. 1, 2 and 8 a support tray of my invention, generally designated 1, receiving and supporting a power tool such as a power saw, generally designated 2, and various accessories. Saw 2 can be of any conventional type, having a drive motor and housing 3, a handle 4, a power cord 5, a foot 6 having a typical pivotal support bracket and bevel gauge mounting arrangement 7 with a clamping nut 8, a saw blade 9 and a blade guard 10. Such power saws are well-known and the showing thereof herein is intended to be only illustrative of any conventional power saw.

Tray 1 is blow molded of thermoplastic material, and is of hollow box-like form having a bottom wall 12, opposite side walls 13 and 14 and opposite end walls 15 and 16. Adjacent their upper ends, the side and end walls 13-16 taper inwardly from the mold parting line indicated at 17 to a top wall 18 a portion of which, indicated at 19, comprises a supporting surface receiving the foot 6 of saw 2. Foot supporting surface 19 surrounds an opening 20 defined by depending wall portions 21 therearound and providing access through the top wall to the interior of the box for storage purposes and to accommodate saw blade 9 when the saw is in storage position on the tray.

Along the inner side edge of supporting surface 19 the top wall is formed to provide a vertical wall portion 22, and in spaced relation between wall 22 and side wall 14 the top wall is alternately elevated and compartmented, as indicated at 24, 25, 26, 27, and 28. Compartments 25 and 27 are defined by depending side walls and a bottom wall, as clearly shown in FIG. 8, and are designed to accommodate therein a typical power saw rip fence arm 29 and wrench 30, respectively. The top wall portions 24, 26 and 28 are recessed, as illustrated at 31, 32 and 33, respectively, to receive and cradle saw motor housing 3 when saw foot 6 is resting on its supporting surface 19. Top wall portion 28 also functions as an end stop, to assist in properly seating saw foot 6 and motor housing 3 on the tray.

The top wall 18 of tray 1 also is recessed at one end of compartments 25 and 27, as shown at 34, to accommodate the guide portion 35 of the rip fence and also that end of wrench 30. The rip fence guide 35 confines the fence in its compartment 25, and the end of compartment 27 remote from the recess 34 is both angled and closed, as shown in FIG. 2, whereby the wrench is accommodated and effectively confined in its compartment 27. Top wall 18 also is cut away in the corner on the same side but at the opposite end of tray 1 from recess 34, to provide an opening 37 defined by depending wall portions 38 providing additional access through top wall 18 into the interior of box 1, for convenience of storage. Rip fence compartment 25, unlike compartment 27, opens into opening 37 to accommodate the full length of arm 29.

Bottom wall 12 is formed to provide a semi-circular internal rib 40, and an inwardly projecting post 41. A circular saw blade 9 can be inserted through the larger opening 20 and placed on bottom wall 12 with the blade edge bearing against rib 40 where it joins wall 12, and with the blade body resting on post 41 which supports the blade at an angle to bottom wall 12 to facilitate reaching beneath the blade on the side opposite rib 40 to remove it from the box through opening 20. Rib 40 holds the blade against sliding, maintaining the blade in its inclined storage position. In addition, rib 40 acts as a guard, protecting power cord 5 from abrading against the saw blade teeth when the cord 5 is inserted through opening 37 into the box for storage. Any portion of the cord which tends to be displaced over rib 40 and above the saw blade will be cammed over the blade teeth by rib 40, thereby preventing cutting of the cord by the blade.

Figure 11:
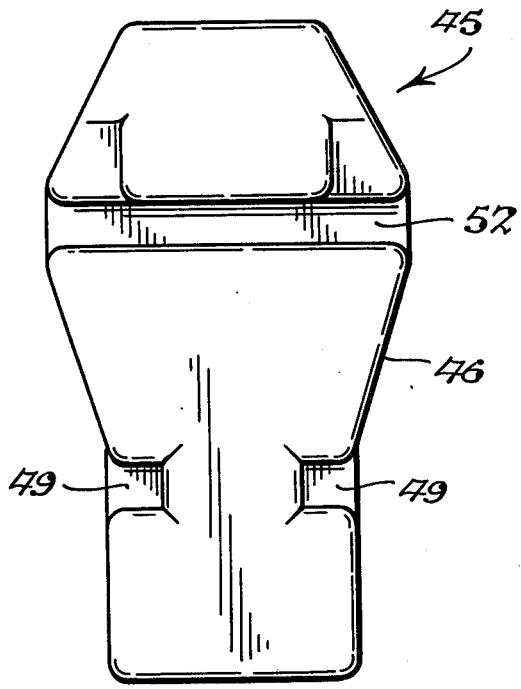
FIG. 11 is a front elevational view of the latch member, apart from the tray.
Figure 9:
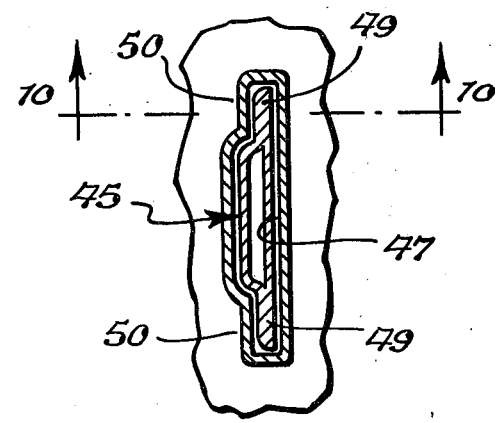
FIG. 9 is a fragmentary sectional view thereof taken about on line 9—9 of FIG. 7.
Figure 10:
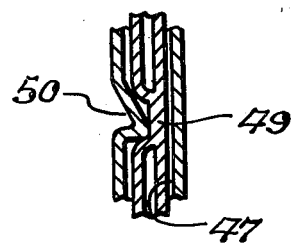
FIG. 10 is a fragmentary sectional view thereof taken about on line 10—10 of FIG. 9.
Figure 12:
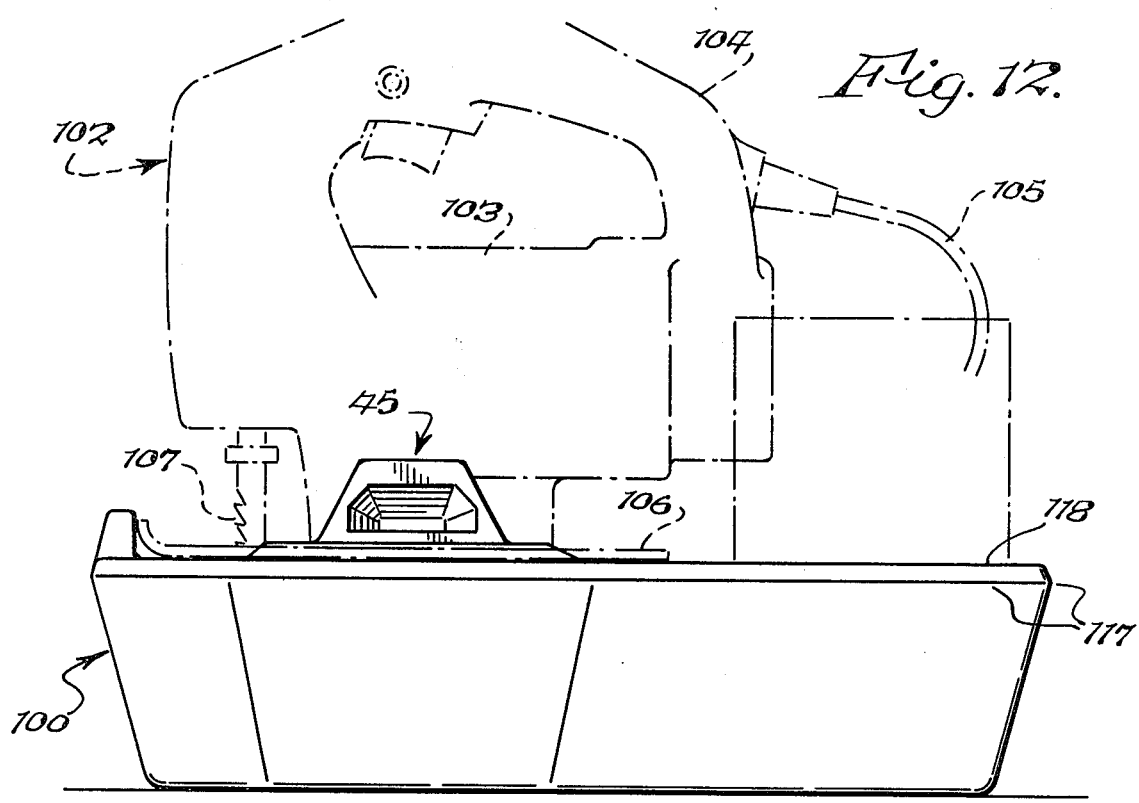
FIG. 12 is a view like that of FIG. 1 but showing a modified support tray and container of my invention supporting a different power tool, in this case a sabre saw indicated in phantom.
Figure 13:
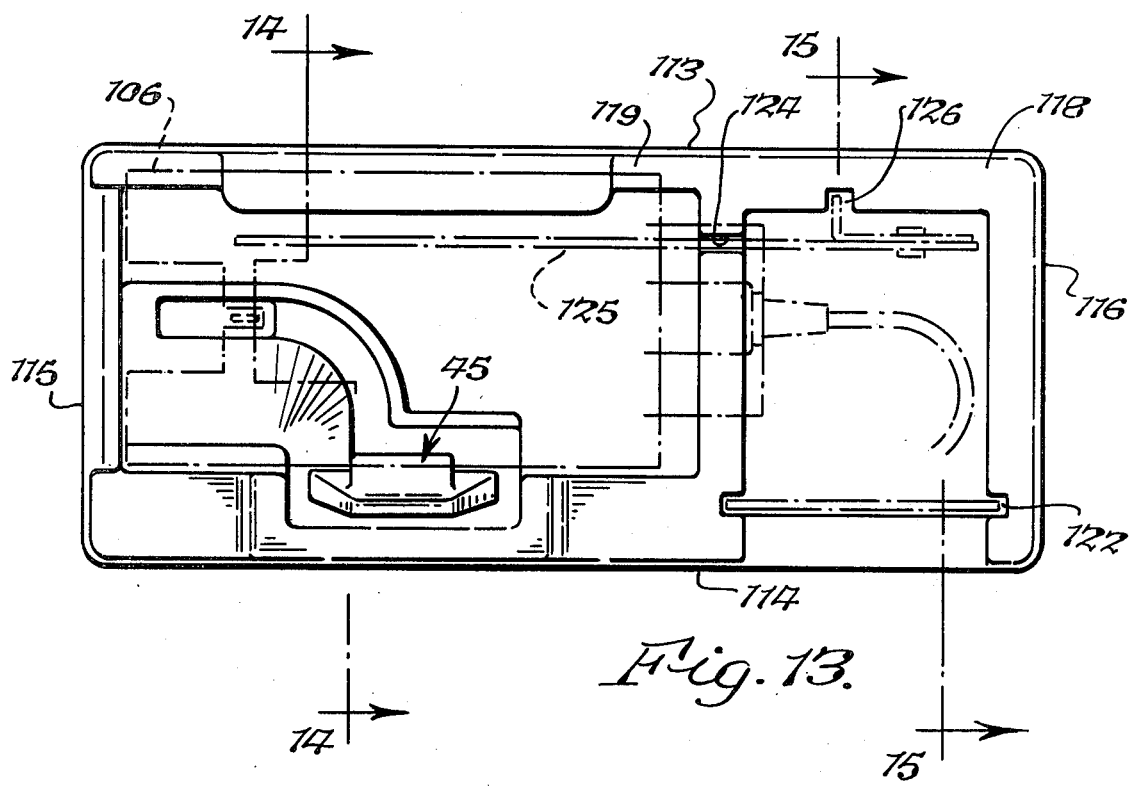
FIG. 13 is a top plan view thereof.
Figure 14:
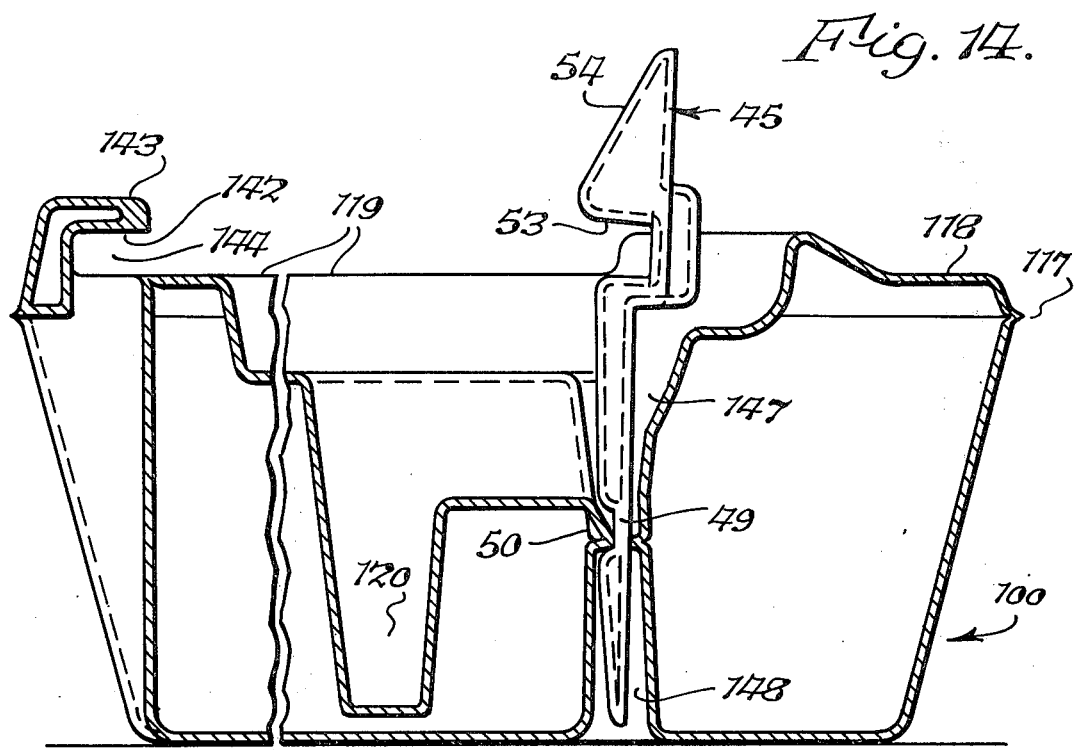
FIG. 14 is a sectional view thereof taken about on line 14—14 of FIG. 13 but on an enlarged scale, the tool and accessories being omitted for greater clarity and parts being broken away for convenience in illustration.
Figure 15:
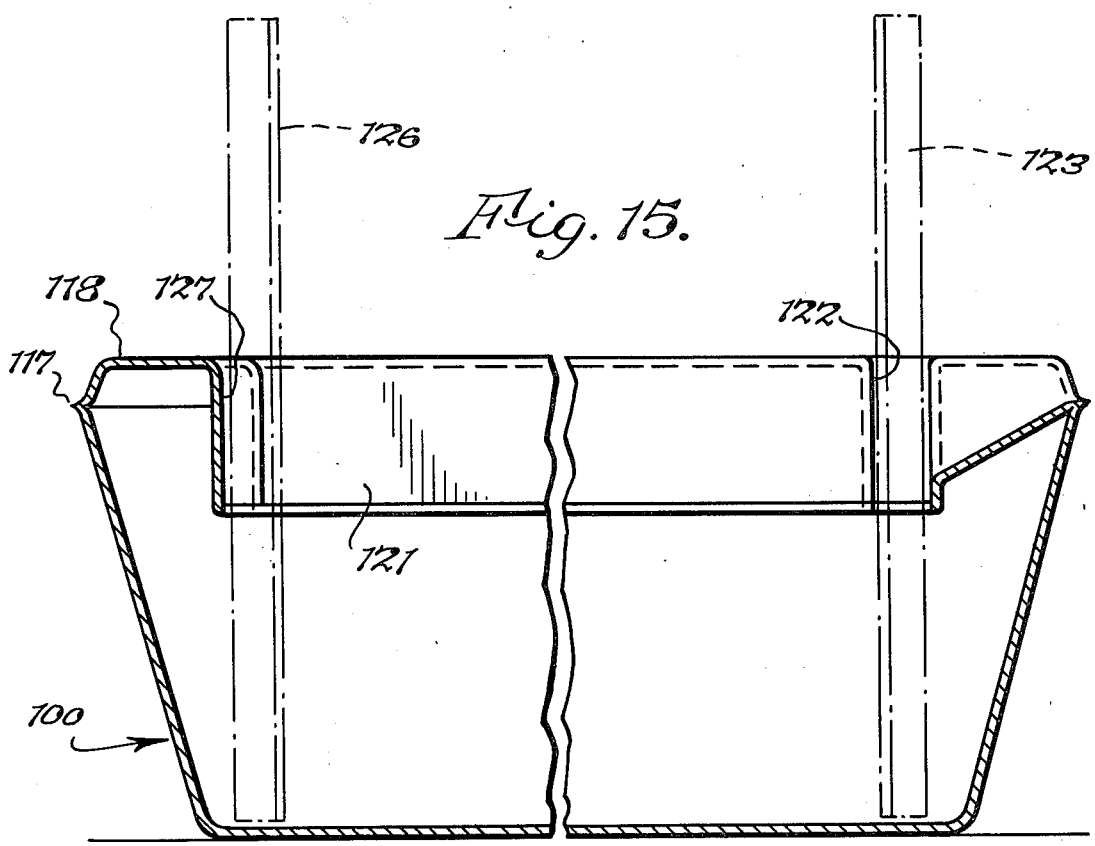
FIG. 15 is a sectional view thereof taken about on line 15—15 of FIG. 13 but on an enlarged scale.

Saw foot 6 is releasably held against the supporting top wall surface 19 by engagement at its forward end beneath a shoulder 42 spaced above the surface 19. Shoulder 42 is formed by elevating the top wall of the box and providing a recessed bracket 43 of hollow and double wall construction having shoulder 42 as a horizontal inner wall. An opening 44 is formed, in a manner to be described between bracket 43 and supporting surface 19 through which the forward end of shoe 6 is slid for engagement beneath the overhanging shoulder 42 of bracket 43. At its opposite end, shoe 6 is engaged by a spring latch mechanism, generally designated 45, which also may be of hollow double wall construction, as shown, and is provided with an elongated, tapering tongue 46 which fits into opposing, communicating recesses 47, 48 in the top and bottom walls of the box. The spaced walls of tongue 46 are joined adjacent opposite sides thereof, as indicated at 49 in FIG. 11, providing a pair of recessed portions adapted to be engaged by a pair of spaced barbs 50 formed in the recess-defining wall 51 of the box, as shown in FIGS. 7, 9 and 10. With this arrangement, latch 45 is separately fabricated and then fitted to the box by inserting its tongue 46 downwardly through recess 47 and into the recess 48, until the inset shouldered portions 49 engage beneath the detents or barbs 50, whereupon latch 45 is firmly secured in the operative position shown in FIG. 7.

At its upper end portion, the latch 45 is of generally C shape, being inset, as shown at 52, to receive the opposite end of foot 6, and to form a shoulder 53 adapted in the normal position of the latch to overhang shoe 6 in the same manner as shoulder 42. However, whereas bracket 43 is fixed in position, latch 45 is resiliently yieldable because it is made of a resiliently yieldable thermoplastic material and its elongated tongue 46 has limited movement within recesses 47 and 48 about its points of engagement with barbs 40.

The particular configuration of latch 45 may vary, as long as the latch construction provides adequate strength for the intended purpose. With the latch assembled and in its normal position, shown in FIG. 7, saw 2 may be mounted on box 1 by slipping the forward end of shoe 6 through openings 44 and beneath shoulder 42, at the same time pressing the rearward portion of shoe 6 downwardly against the inclined cam face 54 of latch 45 to cam the upper portion of the latch out of the way and permit movement of shoe 6 into fully seated engagement on and against supporting surface 19, whereupon the inherent resiliency of latch 45 will cause it to be self-restoring to the position shown in FIG. 7, with shoulder 53 overhanging shoe 6.

Thus saw 2 is readily fitted in place on supporting tray 1 where it is releasably latched in its supported storage position by the recessed bracket 43 and latch 45. When releasably latched in this manner, the assembled tray and saw can be moved about simply by lifting the total package, using the saw handle 4, whereby the tray containing the various accessories and the power cord, all neatly packaged, is carried about with the saw. Using the saw handle to carry the entire assembly has the advantage that saw handle 4 already is constructed and designed to be of adequate strength to fully support the saw. Supporting tray 1 being made of plastic is much lighter than saw 2 whereby the slight additional weight of the tray even when it contains a blade, rip fence and other accessories, is well within the supporting capabilities of the normal saw handle when used to carry the same about. There is no need for or problem of providing another handle, directly attached to the tray in a manner sufficiently strong to withstand the weight of the saw.

Whenever the saw is set down the supporting tray provides a cushioned base, and its box construction is more than adequate to support the weight of the saw. The walls defining recesses 47 and 48 provide a tubular reinforcing strut between the top and bottom walls, and depending walls 21 and 38 provide added reinforcement. Tray 1 also cushions the saw against damage upon accidentally hitting a workbench or other structure as the saw is being carried about.

When it is desired to use the saw, it is readily removed from the tray simply by flexing the resilient latch 45, to the right as viewed in FIG. 7, and then picking up the saw while sliding the forward end of its shoe 6 from beneath the shouldered bracket 43.

Tray 1 provides an ideal vehicle for the packaging and display of the power tool, because the assembled tool and tray can be completely enclosed in a transparent overwarp of, for example, a clear plastic material which surrounds and protects the assembly while permitting prospective purchasers to view the same in a manner avoiding any need for removal of the tool.

The supporting tray of this invention can readily be designed to accommodate a variety of accessories and also power tools other than a circular saw. For example, there is shown in FIGS. 12-15 a tray, generally designated 100, similar to tray 1 and adapted to receive a sabre saw 102 having a motor and housing 103, a handle 104, a power cord 105, a shoe 106 and a blade 107. Tray 100 is like box 1, having opposite side walls 113 and 114 and opposite end walls 115 and 116, the upper portions of these walls being inwardly inclined from parting line 117 to a top wall 118. A portion 119 of the top wall provides a supporting surface for foot 106 and the top wall is additionally recessed, very deeply as indicated at 120, to accommodate the saw blade 107. Top wall 118 is cut away to provide an opening defined by the depending wall 121 through which power cord 105 and any accessories or small parts can be inserted to the interior of the box for storage therein. Top wall 118 and the skirt wall 121 are slotted, as indicated at 122 to receive a card 123 which can contain additional blades or other accessories. Top wall 118 is recessed, to provide a compartment or slot 124 receiving the arm 125 of a rip fence the end of which, shown at 126, fits within a slot 127 also formed in depending skirt 121.

Saw 102 is releasably latched to its supporting surface 119 in the same manner as previously described, except that the shouldered bracket and releasable latch engage opposite sides of saw foot 106 instead of the opposite ends thereof. Thus, tray 100 is formed to provide a recessed bracket 143 defining a shoulder 142 adapted to overhang foot 106 when it is slid through an opening 144 between bracket 143 and supporting surface 119. A latch 45, identical to that previously described, is inserted in the communicating recesses 147 and 148 which can be similar to recesses 47 and 48 previously described, the wall of recess 141 providing a pair of barbs or detents 50 engaging the inset shouldered portions 49 of the latch, as previously described. Here, again the saw 102 is readily fitted to the tray by sliding one side of the saw foot 106 beneath the bracket 143, with the opposite side of the foot engaging the surface 54 to cam latch 45 out of the way, the resiliency of latch 45 causing it to snap back over the opposite side of saw foot 106 to releasably latch the foot in position against supporting surface 119 and thereby releasably latch the saw in place on supporting tray 101. All of the advantages previously described are present in the embodiment of FIGS. 12-15, the handle 104 of the saw being used to carry the tray about with the saw, and it will be appreciated that the supporting tray and container of this invention can be adapted to accommodate still other tools.

Apparatus for molding trays of this invention is indicated schematically in FIG. 16. Molten thermoplastic material is fed into an extrusion die 56 of known type, by conventional feed means, not shown, from a suitable supply. A lift member 57 driven by a suitable motor 58 can be used to adjust the die 56 to extrude a parison 59 of the desired wall thickness. The extruded parison is passed between a pair of mold sections 60, 61, which are mounted for movement into and out of engagement about the parison by suitable drive means. In carrying out the process of the invention, mold sections 60, 61 are engaged about the parison, trapping a portion of the parison between them and having meeting surfaces which pinch the extraneous parison portions as indicated at 62 in FIG. 6, creating the mold line 17, 117. Compressed air, from a suitable source is introduced into the trapped portion in a known manner to expand it against the mold surfaces, and the spaces between the mold surfaces and the trapped parison portion are vented, all in a manner well understood in the art. Cooling water can be circulated through passages (not shown) in the mold sections, and the mold apparatus can be controlled in a timed manner, all by means well known and understood in the art and therefore only schematically indicated in FIG. 16.

Wall openings in blow molded boxes usually are formed by removing the plastic material after molding, as by cutting or routing. However, while it is a relatively simple matter to cut away material to form the openings 20 and 37 and the opening defined by wall 121, which openings are in planes substantially parallel to the plane of parting line 17, it becomes quite difficult to do this in the case of an opening such as 44 or 144 because of the difficulty in manipulating a cutting or routing tool adjacent wall 19 to accomplish this. In other words, the position of the material to be removed makes its removal after molding very difficult because of interference with the adjacent plastic wall parts.

Therefore, it is a further feature of my invention that method and means are provided to form openings such as 44 and 144 or facilitate their formation, during and as part of the mold cycle. Such means comprise, in the illustrated embodiment, a projection 64 on mold section 61 which section forms the bottom wall 12, and side and end walls 13–16 of the tray up to parting line 17. Part 64 projects into a recess in mold section 60 which section forms top wall 18 and the upper portions of the side and end walls of the tray above the parting line, past a surface 65 on mold section 60 against which projection 64 moves to shear the plastic material therebetween, either completely removing it or at least substantially reducing its thickness to define the opening and leave only a thin web or membrane 66. In other words, picturing the mold sections just prior to closing, the projection 64 carries the adjacent parison wall into mold section 60, forming wall portions 67 and 68 which are spaced from the wall portions 69 and 70 of bracket formation 43, providing a hollow, double wall construction communicating at its ends with the hollow interior of the tray. As projection 64 does this, moving past the parting line 17, it moves against wall surface 65 of moldsection 60 in shearing relation thereto, removing most if not all of the plastic material originally present between top wall surface 19 and shoulder surface 42. When a relatively thin web remains, as shown at 66, it is quickly removed by a knife, without need for routing or heavy cutting which would be relatively more difficult, particularly because of the adjacent wall surface, thereby facilitating the final formation of the opening after molding.

The coacting shearing surfaces of projection 64 and wall 65 extend completely across opening 44, for the full height thereof, and around behind projection 64, as viewed in FIG. 6, to form the corresponding leg of opening 44 which extends completely along the line 71, around the corner and along the shorter portion 72, shown in FIG. 2. Opening 144 is formed or defined in the same manner. The shearing action, as distinguished from the pinching action at the parting line, forms or defines an opening within the parting line and at a right angle to the plane thereof by moving one surface or edge thereof across another surface in a manner at least substantially removing the material therebetween.

Recesses 47 and 48 are formed by projections, not shown, on mold sections 60 and 61, respectively, which sections meet, or substantially so, upon engagement of the mold sections. The thin web remaining therebetween is readily removed by cutting.

While the method and means for defining an opening by shearing during molding are disclosed herein in conjunction with the power tool supporting tray of my invention, it will be appreciated that they are not limited to the production of such items but will find utility in defining openings in other blow molded plastic items.

Accordingly, it is seen that my invention fully accomplishes its intended objects, providing a power tool supporting tray of great utility and versatility, forming an effective display package as well as a storage tray which is relatively low in cost and lightweight, and which utilizes the handle of the power tool as the handle by which the packaged tool and its supporting tray are carried about. Also, method and means have been developed for defining openings in the blown article during the molding thereof and as part of the mold cycle, in a manner greatly facilitating the forming of such openings and reducing the labor and difficulty which otherwise would be encountered. The tray, including the latch 45, can be made of any suitable thermoplastic material, such as high density polyethylene, polypropylene, polyvinyl and elastomeric polyolefin. While only selected embodiments of my invention have been disclosed and described in detail, it will be appreciated that this has been done by way of illustration only and without thought of limitation.

I claim:

1. Blow molding apparatus for forming a thermoplastic article intended to have an opening through a wall portion thereof which comprises mold sections adapted to be moved into engagement about thermoplastic material, said mold sections when engaged forming a cavity having the shape of said article, means for delivering thermoplastic material between said mold sections, means for expanding said material within said cavity to form said article, said mold sections having coacting portions movable in predetermined substantially parallel, opposite directions one past the other and in close proximity to one another so as to shear a portion of said material in the area intended to have said opening whereby said area lies in a plane substantially parallel to said direction of movement of said mold sections.

2. Apparatus as set forth in claim 1, wherein said portion of said material is completely removed by said coacting portions to form said opening.

3. Apparatus as set forth in claim 1, wherein a thin web of the sheared portion remains, facilitating subsequent removal to provide said opening.

4. The method of molding an article intended to have an opening through a wall thereof which comprises delivering thermoplastic material between mold sections adapted when engaged to form a cavity having the shape of the article, engaging the mold sections in predetermined substantially parallel, opposite directions one past the other and in close proximity to one another, and expanding the material in the cavity to form the article so as to shear a portion of the material within the cavity during the mold cycle in the area intended to have the opening whereby said area lies in a plane substantially parallel to said direction of movement of said mold sections.

5. The method of claim 4, wherein the portion of material is removed during the mold cycle.

6. The method of claim 4, wherein a relatively thin web remains of the sheared portion of material.

* * * * *